United States Patent
Broer

(10) Patent No.: US 6,210,012 B1
(45) Date of Patent: Apr. 3, 2001

(54) BACKLIGHT SYSTEM AND DISPLAY DEVICE COMPRISING SUCH A SYSTEM

(75) Inventor: Dirk J. Broer, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/271,196

(22) Filed: Mar. 17, 1999

(30) Foreign Application Priority Data

Mar. 27, 1998 (EP) .................................................. 98200968

(51) Int. Cl.[7] .......................................................... F21V 9/16
(52) U.S. Cl. ................................................. 362/84; 362/27
(58) Field of Search ................................. 362/31, 27, 19, 362/84, 318, 561; 349/65, 69, 71; 250/493.1

(56) References Cited

U.S. PATENT DOCUMENTS

| | | | |
|---|---|---|---|
| 4,678,285 | * | 7/1987 | Ohta ........................................ 349/71 |
| 5,146,355 | * | 9/1992 | Prince ..................................... 349/71 |
| 5,808,709 | * | 9/1998 | Davis ..................................... 349/65 |
| 5,856,814 | * | 1/1999 | Yagyu ..................................... 345/89 |

FOREIGN PATENT DOCUMENTS

| | | | |
|---|---|---|---|
| 2 096 160 | * | 10/1982 | (GB) . |
| 9725650 | | 7/1997 | (WO) ........................... G02F/1/1335 |

OTHER PUBLICATIONS

Research Disclosure Jan. 1991, Cathodoluminescent Backlight for Liquid Crystal Displays, p. 74.

* cited by examiner

Primary Examiner—Sandra O'Shea
Assistant Examiner—Hargobind S. Sawhney
(74) Attorney, Agent, or Firm—Aaron Waxler

(57) ABSTRACT

Backlight system in which colors are generated sequentially by coupling short-wave radiation from a source (2) into a waveguide (4) via an optical shutter (6) which sequentially excites luminescent materials (5) radiating at different wavelengths.

14 Claims, 3 Drawing Sheets

BACKLIGHT SYSTEM AND DISPLAY DEVICE COMPRISING SUCH A SYSTEM

BACKGROUND OF THE INVENTION

The invention relates to a backlight system for sequential illumination in at least two wavelength ranges, comprising materials luminescing in said wavelength ranges.

The invention also relates to a display device comprising such a backlight system.

Display devices of this type are used in, for example, televisions, monitors but also in, for example, projection devices.

Such a backlight system for an LCD is described in Research Disclosure January 1991, page 74 and is based on field emission. By using such a backlight system, in which red, green and blue phosphors are activated alternately, color filters in the LCD may be dispensed with.

A drawback of the backlight system shown are the high voltages (>1000 V) which are not compatible at all with those used in LCDs (up to 10 to 20 V). The phosphor patterns are also provided in a strip-shaped pattern, which leads to a non-uniform illumination.

SUMMARY OF THE INVENTION

It is an object of the present invention, inter alia, to obviate said drawbacks completely or partly.

To this end, the backlight system comprises at least one radiation source which is suitable for emitting sufficient short-wave radiation along a path to excite the luminescent materials, a waveguide and at least one optical shutter between the radiation source and the luminescent materials or between the waveguide and the luminescent materials.

As will be shown, for example, a gas discharge tube is used for the radiation source, which can operate at a much lower voltage (up to approximately 12 V) than is necessary for field emission.

Due to the presence of the waveguide, a uniform illumination is realized.

For example, a liquid crystal switch (LC cell) is used as an optical shutter. For an efficient use of the short-wave radiation, a reflective polarizer effective in the short-wave radiation range is arranged between the radiation source and the waveguide or between the waveguide and the luminescent materials.

A first embodiment of a backlight system according to the invention is characterized in that the luminescent material comprises a layer having areas luminescing in different wavelength ranges, and in that the backlight system comprises means for causing the optical shutters to sequentially pass short-wave radiation for each wavelength range. The layer is present on, for example, the end face of a plate-shaped waveguide and comprises a layer with juxtaposed luminescent areas.

A preferred embodiment of a backlight system according to the invention is therefore characterized in that the backlight system comprises at least two layers of a material luminescing in different wavelength ranges. In this case, the (for example, red, green or blue) light is coupled into the entire surface of the end face (or more faces) of a plate-shaped waveguide. Since the areas are not juxtaposed in this case, the entire surface of the end face can be utilized for coupling in the light. In a variant, the short-wave radiation is coupled in while the luminescent material is present at the area of an exit face. In another variant, the short-wave radiation source is present on the side of the plate-shaped waveguide opposite the exit face. In a further variant, the entrance face is enlarged by providing the plate with a (part of an) edge which is bent or situated at an angle.

The efficiency of the backlight system is even further enhanced by providing a short-wave pass filter between the optical shutter and the luminescent materials, or a long-wave pass filter on the side of the luminescent materials remote from the optical shutter.

These and other aspects of the invention are apparent from and will be elucidated with reference to the embodiments described hereinafter.

BRIEF DESCRIPTION OF THE DRAWINGS

In the drawings:

FIG. 3 shows a variant of the embodiment of FIG. 2, while

The Figures are diagrammatic and not to scale. Corresponding components generally have the same reference numerals.

DETAILED DESCRIPTION OF THE PREFERRED EMBODIMENTS

Figure 1:
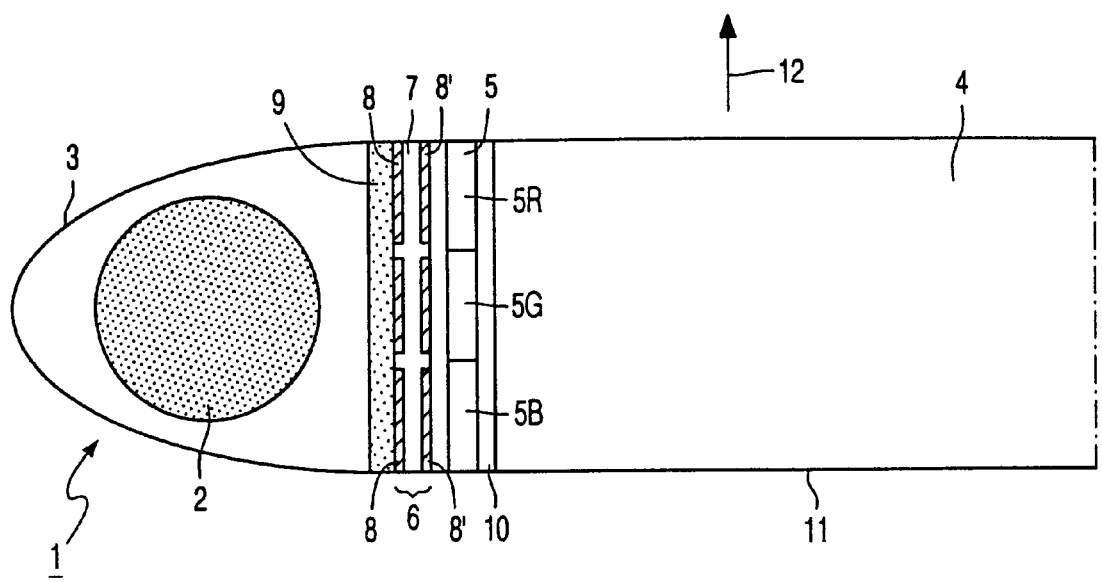
FIG. 1 shows a first embodiment of a backlight system according to the invention.

FIG. 1 shows a backlight system 1 according to the invention, comprising a radiation source, for example, a lamp 2 suitable for emitting short-wave radiation, for example UV radiation, accommodated in a lamp housing 3. Radiation emitted by the lamp 2 reaches an optical shutter 6, in this case a liquid crystal switch with a liquid crystal material 7 between substrates (not shown), comprising electrodes 8, 8'.

In this embodiment, the optical shutter is present at the end face of a plate-shaped waveguide 4 of PMMA (poly [methylmethacrylate]) between this waveguide and the radiation source 2. The waveguide has a thickness of, for example approximately 2.4 mm and is provided with light-scattering elements or a groove structure at its bottom side 11, such that light exits in the direction of the arrows 12. Moreover, the system shown in FIG. 1 is provided with a layer of luminescent material S between the optical shutter 6 and the waveguide 4.

In this embodiment, the layer of luminescent material 5 comprises areas which luminesce in different wavelength ranges and emit light in, for example, the red (5R), the blue (5B) and the green (5G) part of the spectrum. In this embodiment, the different areas have the shape of strips with a width of approximately 0.8 mm and are aligned with parts of the optical shutter 6 defined by strip-shaped electrodes 8, 8', while the backlight system comprises means (not shown in FIG. 1) to cause these parts of the optical shutter to sequentially pass short-wave radiation for each area.

The lamp 2 emits sufficient short-wave radiation to excite the luminescent materials 5R, 5G, 5B; to this end, use is made of, for example, a UV gas discharge lamp (254 nm) or a fluorescence lamp which emits in the UV range (365 nm) or a fluorescence lamp which emits in the blue range (450 nm).

When using optical shutters based on a change of polarization, such as those based on liquid crystals, it is advantageous for a high efficiency, though not necessary for the principle of the invention, to make use of reflective polarizers 9 (between the lamp housing 3 and the optical shutter 6) and 10 (between the waveguide 4 and the luminescent materials 5) which are optimized for the radiation emitted by the lamp 2. The reflective polarizers are based on, for example cholesteric filters and then pass (for example) levorotatory radiation, whereas dextrorotatory radiation is reflected, or conversely. Other (retro)reflective polarizers pass radiation polarized in one direction and reflect radiation polarized perpendicularly thereto.

During use (for example) UV radiation of the lamp 2 is polarized in a very effective way by means of the reflective polarizer 9. The reflective polarizer passes one type of (linearly or circularly) polarized light, whereas light polarized in the other direction is reflected. The reflected light is reflected via the wall of the lamp housing, while the direction of polarization changes. The wall is adapted in such a way that a further part of the emitted radiation receives the correct direction of polarization so as to be passed by the reflective polarizer 9.

Within a frame period of a display device illuminated by the backlight system (for example 20 msec), parts of the optical shutter which co-operate with the luminescent parts 5R, 5G, 5B are consecutively activated in such a way that they pass the UV radiation. When, for example, first the switch at the area of the red part 5R is radiation-transmissive, this part will be activated and emits red light which reaches the waveguide 4 and is emitted in the direction 12. Subsequently, the switch at the area of the green part SG becomes radiation-transmissive and subsequently the switch at the area of the blue part SB becomes radiation-transmissive. In this way, uniform red, green and blue light is consecutively obtained within one frame period across the surface of the waveguide. By activating two switches at a time, the colors cyan, yellow and magenta are alternately obtained across a larger surface (higher efficiency).

In the present embodiment, the backlight system includes a second reflective polarizer 10. When using an LCD as an optical shutter, the direction of polarization is changed when the light is passed, but it remains unchanged for possible residual radiation in the other parts. The reflective polarizer 10 is adapted in such a way that radiation having the correct direction of polarization (in this case a changed direction) is passed, and all other UV radiation (residual radiation) is reflected to the lamp housing 2 where it is recycled as described above.

The strip-shaped areas 5R, 5G and 5B and the electrodes of the corresponding parts of the optical shutter have an identical width in this embodiment; however, this width may vary dependent on the effectiveness of coupling in the waveguide, the efficiency of the luminescent materials, etc. Instead of strip-shaped patterns, other patterns may be chosen for the areas 5 such as, for example, a chessboard pattern.

Figure 2:
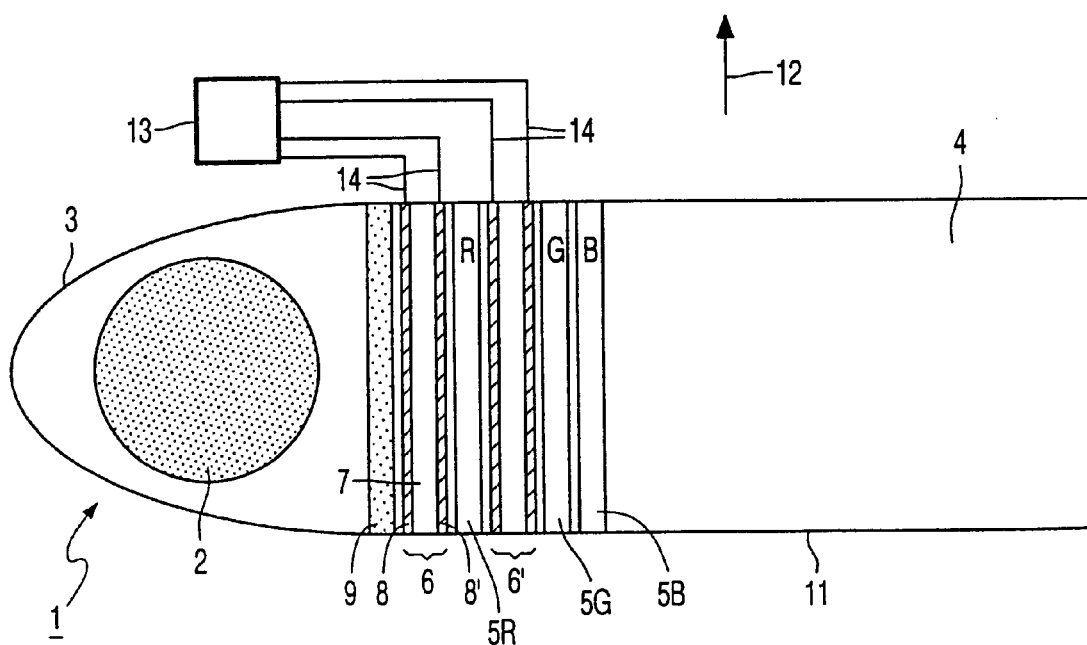
FIG. 2 shows a second embodiment of a backlight system according to the invention.

In the system of FIG. 1, the short-wave radiation is coupled in through only ⅓ part of the thickness of the waveguide. FIG. 2 shows another system in which the short-wave radiation is coupled in throughout the thickness of the waveguide. The reflective polarizer 9 again ensures an effective coupling of UV radiation into the optical shutter 6, which activates the luminescent layer 5R radiating red light into the waveguide 4 in the absence of the layers 5G, 5B and a second optical shutter 6'. In such a variant (not shown) for example, another end face of the waveguide is similarly provided with a combination of an optical shutter and a luminescent layer which radiates, for example, blue light and, if necessary, a third end face is provided with such a combination which radiates green light.

In the system of FIG. 2, the layers 5R, 5G and 5B comprise anisotropic luminescent material. Such materials absorb radiation (light) polarized in one direction and emit radiation (light) polarized in the same direction. In the opposite direction (perpendicular thereto or of opposite rotation) light is passed unhindered. The absorption axes of the layers are parallel or perpendicular to the axis of the reflective polarizer 9, while the absorption axes of the layers 5G and 5B cross each other mutually perpendicularly. For the optical shutters, a liquid crystal switch is used in this embodiment, which switches between retardation 0 and retardation $1/2\lambda$, in which $\lambda$ is the (average) wavelength of the radiation source (lamp) 2. The backlight system comprises control means 13 for causing the optical shutters for the light emitted by the anisotropic luminescent material to switch via connections 14 between a substantially completely transmissive state (retardation 0) and a substantially non-transmissive state (retardation $1/2\lambda$).

Within a frame period of a display device illuminated by the backlight system, for example, first the optical shutter 6 remains unactivated (retardation 0) so that it passes UV radiation with a direction of polarization parallel to a given axis of the red anisotropic luminescent material 5R, so that this layer emits red light which passes the optical shutter 6' unhindered (which switch is also set at retardation 0), as well as the layers 5G and 5B, so that the red light reaches the waveguide 4. Subsequently (within the same frame period), the optical shutter 6 is activated (retardation $1/2\lambda$) so that it passes UV radiation with a direction of polarization perpendicular to the axis of the red anisotropic luminescent material 5R so that this UV light reaches the optical shutter 6' unhindered. Dependent on the state of the switch 6', the polarization of the UV light is rotated through 0 or 90 degrees so that either the layer 5G (green anisotropic luminescent material) or the layer 5B (blue anisotropic luminescent material) emits green or blue light, respectively, reaching the waveguide 4. In this way, the backlight system effectively emits red, green and blue light within one frame period.

Figure 3:
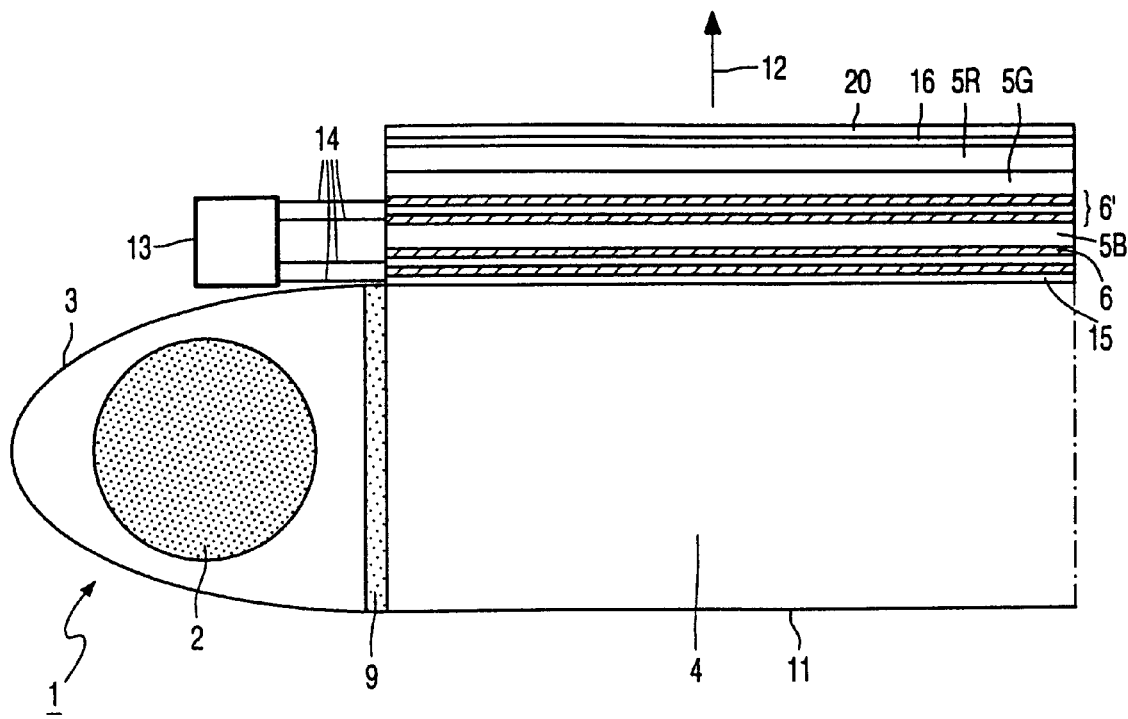

FIG. 3 shows a variant of the system of FIG. 2 in which the stack of luminescent layers 5 and optical shutters 6 is provided on the upper side of the waveguide 4. Via the end face, UV light or other short-wave radiation is coupled into the waveguide 4 in the manner described above by way of a construction consisting of a radiation source 2 and a reflective polarizer, which waveguide is now optimized for this radiation. Similarly as described with reference to FIG. 2, red, green and blue light is consecutively emitted in the stack of luminescent layers 5 and optical shutters 6, because UV light is coupled out to this stack. If the so-called Stokes shift (difference in wavelength of the excitation source and the emitted light) is insufficient, a stack of phosphors is used, if necessary (stepped shift).

The system of FIG. 3 further comprises a short-wave pass filter 15. This filter passes the shortwave radiation (UV radiation) but reflects light generated in the layers 5 in the direction of the exiting light (arrow 12). A long-wave pass filter 16 reflects UV light passed by the stack and passes red, green and blue light. The filter 15 may consist of a stack of dielectric layers but may also be formed as a combination of cholesteric filters, one of which operates, for example, as a reflective polarizer in the range of 200–700 nm and the other has an opposite sense of rotation and reflects in the range between 500 and 700 nm. In this way, a layer is obtained which reflects polarization-selectively in the range of 200 to 400 nm and fully reflects in the range of 400 to 700 nm. The filter 16 comprises a stack of dielectric layers, but also inorganic layers (cholesterics) are possible, as well as multilayer plastics. Such filters may also be used in the systems shown in FIGS. 1 and 2.

Figure 4:
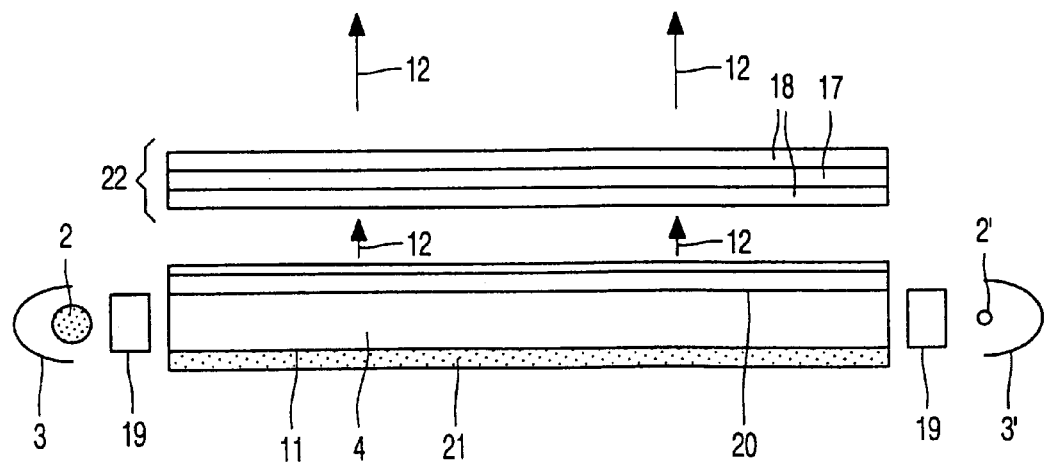
FIG. 4 shows a display device comprising a backlight system as shown in FIG. 1 or 2, and FIGS. 5, 6 and 7 show possible variants of the backlight systems shown in FIGS. 3 and 4.

FIG. 4 shows a display device 22 (LCD) diagrammatically indicated as a liquid crystal layer 17 between two substrates 18 and provided with the backlight system shown in FIG. 1 or 2. The stack of luminescent layers 5 and optical shutters 6 is diagrammatically denoted by means of the blocks 19. A reflector 21 is present at the lower side of the waveguide 4. Exiting light 12 is modulated by the LCD 22, dependent on voltages on picture electrodes (not shown) so that red, green and blue sub-pictures are emitted (denoted by arrows 12') which are observed as a composite color image due to their rapid succession. For the optical shutters, the same liquid crystal material as for the liquid crystal layer 17 is preferably chosen. This provides an optimization as regards system voltages and synchronization. The voltages used are much lower than in the backlight system described in Research Disclosure January 1991, page 74.

The layer 5G (green anisotropic luminescent material) and the layer 5B (blue anisotropic luminescent material) in FIG. 3 mutually emit perpendicularly polarized light, with the direction of polarization of, for example, the green light being parallel to that of the emitted red light and to the direction of transmission of the input polarizer (not shown) of the LCD. To prevent the emitted blue light from being blocked by this input polarizer, the device of FIG. 3, 4 is provided with a retardation foil 20 (1/2λ plate) which rotates the polarization for the blue light through 90 degrees.

Instead of a UV source, the lamp 2 may also emit blue light which excites the red and green phosphors. In the system of FIG. 2, the layer 5B and the optical shutter 7' are then dispensed with. As has been stated, a simplification can also be achieved by coupling in only blue light at the location of lamp 3 in FIG. 4 and one or two other colors (one color when the display device operates with, for example, images composed of two subcolors) at the location of lamp 3'.

Figure 5:
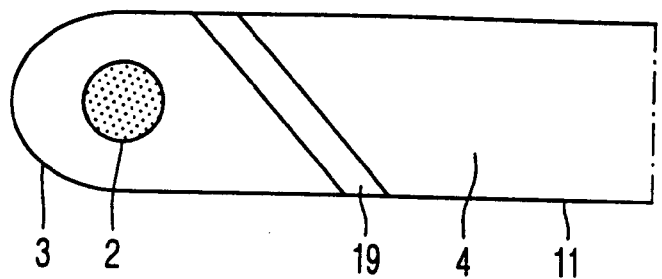
Figure 6:
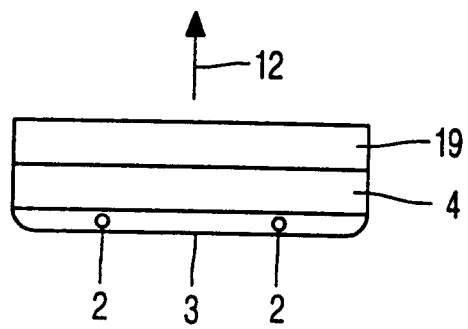

FIGS. 5 and 6 show backlight systems in which the efficiency is further enhanced by using an oblique (or possibly bent) entrance face between the stack 19 and the waveguide 4 or by providing the stack 19 throughout the surface of the waveguide.

Figure 7:
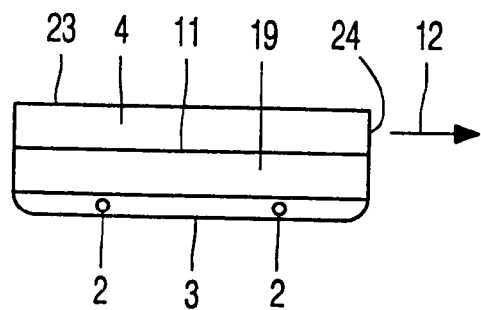

In FIG. 7, the waveguide 4 is present above the stack 19 and its upper side 23 is provided with light-scattering elements or a structure of grooves, as are as well a number of end faces of the waveguide 4 so that light now exits on the end face 24 (with a surface area of, for example 24 mm x 36 mm) in the direction of the arrow 12. After possibly having passed through an optical system, the exiting red, green and blue beams are used for projection display (both reflective and transmissive projection is possible).

The backlight system may be alternatively used for display devices based on, for example, mechanical deformation of mirror surfaces or on a waveguide with local extraction of light, based on a (moving) film addressed by electrostatic forces.

What is claimed is:

1. A backlight system for sequential illumination in at least two wavelength ranges, comprising materials luminescing in said wavelength ranges, characterized in that the backlight system comprises at least one radiation source for emitting short-wave radiation along a path to excite the luminescent materials, said path further including a waveguide and at least one optical shutter.

2. A backlight system as claimed in claim 1, characterized in that a reflective polarizer effective in the short-wave radiation range is arranged in said path.

3. A backlight system as claimed in claim 1 wherein the luminescent material comprises a layer having areas luminescing in different wavelength ranges, and in that the backlight system comprises means for causing the optical shutters to sequentially pass short-wave radiation for each wavelength range.

4. A backlight system as claimed in claim 1 wherein the backlight system comprises at least two layers of a material luminescing in different wavelength ranges.

5. A backlight system as claimed in claim 4, characterized in that at least the layer of luminescent material located most proximate to the optical shutter comprises anisotropic luminescent material, the backlight system comprising means for causing the optical shutter for the light emitted by the anisotropic luminescent material to switch between a substantially completely transmissive state and a substantially non-transmissive state.

6. A backlight system as claimed in claim 5, characterized in that the backlight system comprises a second optical shutter arranged between the layer of anisotropic luminescent material and a second layer of a second anisotropic material luminescing in another wavelength range, the backlight system comprising means for causing the second optical shutter for the light emitted by the second anisotropic luminescent material to switch between a substantially completely transmissive state and a substantially non-transmissive state.

7. A backlight system as claimed in claim 5 wherein the optical shutter has two operational states, and has a polarization-changing effect in one of the two states.

8. A backlight system as claimed in claim 1 wherein a short-wave pass filter is arranged in the light path between the radiation source and the luminescent materials.

9. A backlight system as claimed in claim 1, characterized in that a long-wave pass filter is arranged at the side of the luminescent materials remote from the optical shutter.

10. A display device including a backlight system as claimed in claim 1.

11. A backlight system as claimed in claim 1, characterized in that said optical shutter is disposed in said path between the radiation source and the luminescent materials.

12. A backlight system as claimed in claim 1, characterized in that said optical shutter is disposed in said path between the waveguide and the luminescent materials.

13. A backlight system as claimed in claim 1, characterized in that said reflective polarizer is disposed in said path between the radiation source and the waveguide.

14. A backlight system as claimed in claim 1, characterized in that said reflective polarizer is disposed in said path between the waveguide and the luminescent materials.

* * * * *